United States Patent

Ballocchi et al.

(10) Patent No.: US 10,899,457 B2
(45) Date of Patent: Jan. 26, 2021

(54) COMPOSITE SEAT ASSEMBLIES INCLUDING HIGH PERFORMANCE FIBERS

(71) Applicant: B/E Aerospace, Inc., Winston-Salem, NC (US)

(72) Inventors: Paolo Ballocchi, Dundrum (GB); Damian Christie, Armoy (GB); Nigel McKibbin, Katesbridge (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/398,815

(22) Filed: Apr. 30, 2019

(65) Prior Publication Data

US 2020/0346757 A1 Nov. 5, 2020

(51) Int. Cl.
| | |
|---|---|
| *B60N 2/42* | (2006.01) |
| *B64D 11/06* | (2006.01) |
| *B60N 2/803* | (2018.01) |
| *B60N 2/64* | (2006.01) |
| *B60N 2/68* | (2006.01) |
| *B60N 2/70* | (2006.01) |

(52) U.S. Cl.
CPC ...... *B64D 11/0619* (2014.12); *B64D 11/0647* (2014.12); *B60N 2/4228* (2013.01); *B60N 2/4249* (2013.01); *B60N 2/64* (2013.01); *B60N 2/686* (2013.01); *B60N 2/7011* (2013.01); *B60N 2/803* (2018.02)

(58) Field of Classification Search
CPC ............ B64D 11/0647; B64D 11/0619; B60N 2/7011; B60N 2/686; B60N 2/4228; B60N 2/42709; B60N 2/7029; B60N 2/888; B60N 2/803; B60N 2/4249
USPC ........................................ 297/216.13, 216.14
See application file for complete search history.

(56) References Cited

U.S. PATENT DOCUMENTS

| | | | |
|---|---|---|---|
| 4,630,864 A | 12/1986 | Toll | |
| 7,222,915 B2 | 5/2007 | Philippot et al. | |
| 7,716,797 B2 | 5/2010 | Kismarton et al. | |
| 7,871,039 B2 | 1/2011 | Fullerton et al. | |
| 8,573,704 B2 * | 11/2013 | Peters | A47C 3/04 297/452.56 |
| 9,555,891 B2 * | 1/2017 | Fullerton | B60N 2/7011 |
| 2014/0015290 A1 * | 1/2014 | Saada | B64D 25/04 297/216.13 |
| 2016/0200231 A1 * | 7/2016 | Ter Steeg | B29C 70/68 297/452.62 |

* cited by examiner

*Primary Examiner* — Syed A Islam
(74) *Attorney, Agent, or Firm* — Suiter Swantz pc llo

(57) ABSTRACT

A head-pan diaphragm structure attachable to or an integral part of a seat back structure, the head-pan diaphragm structure including high-performance fibers and the head-pan diaphragm structure positionable in a head strike target area of the seat back structure. A seat back assembly including a seat back frame member including spaced portions, a torsion bar attached between the spaced portions, a head-pan diaphragm structure positioned in a framed opening formed by the torsion bar and a portion of the seat back frame member, the head-pan diaphragm structure positioned in a head strike target area, and the head-pan diaphragm member including integrated high-performance fibers.

15 Claims, 6 Drawing Sheets

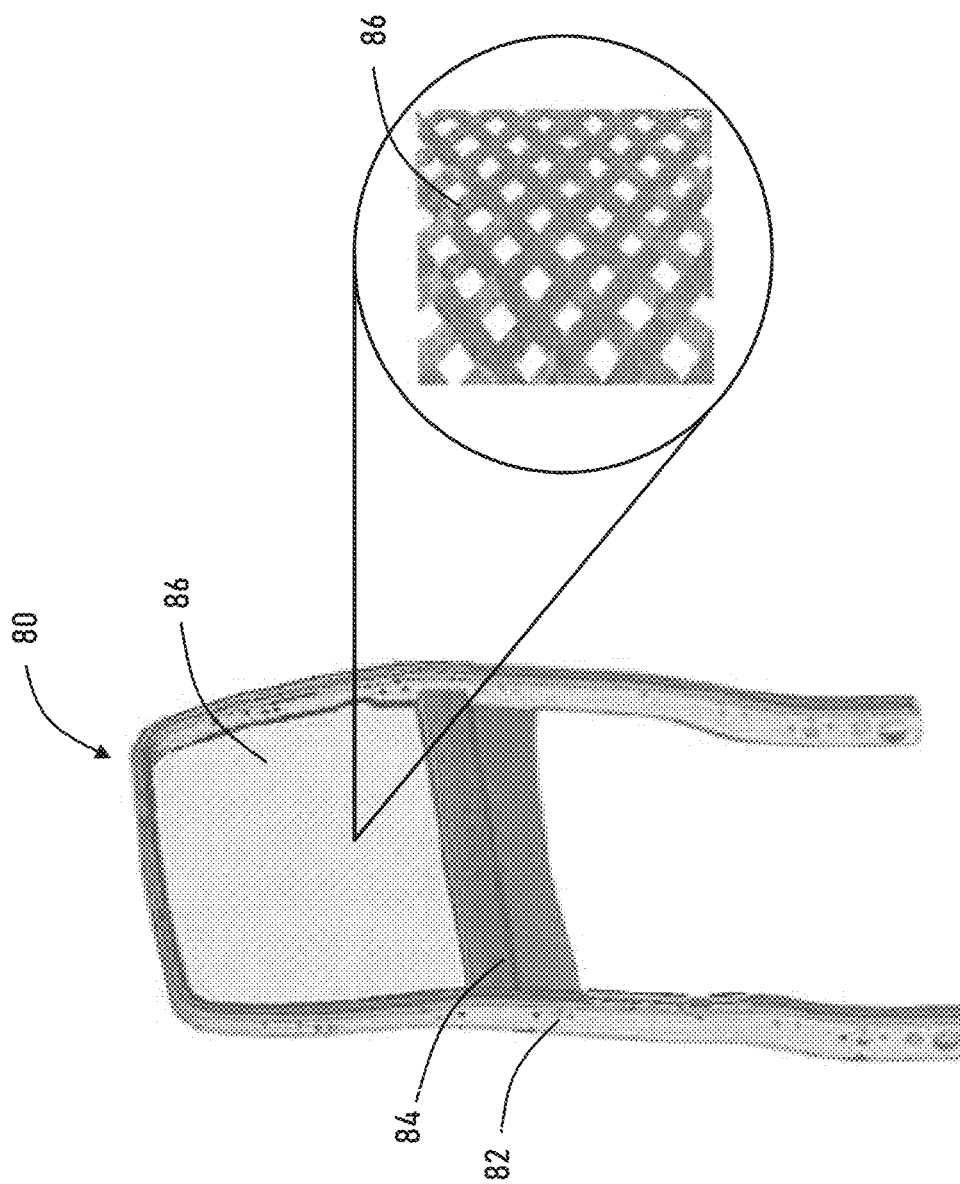

COMPOSITE SEAT ASSEMBLIES INCLUDING HIGH PERFORMANCE FIBERS

BACKGROUND

Aircraft passenger seats are designed and constructed according to government regulations and aircraft manufacturer specifications. Many aspects of seat design are thus constrained by requirements imposed by safety, weight and expense considerations. Within these limits the seat must also be aesthetically pleasing, comfortable to the seat occupant, and functional for the seat occupant as well as airline maintenance, repair and cleaning crews.

Main cabin class seat structures are typically metallic and constructed with a base formed from two or more legs and section assemblies joined together by transverse beam elements that connect the legs and section assemblies in pitched-apart relation to each other, and collectively form a structural frame assembly. A seat pan, occasionally a composite structure, is mounted on the structural frame assembly. A seat back, occasionally a composite structure, is pivotally-mounted between two of the section assemblies such that the angle of the seat back can be adjusted for comfort and safety. Because of the relatively short pitch between rows of seats in the main cabin, the typical range of movement of the seat back is limited. The amount of rearward recline movement is constrained by the position of the rearward row of seats or bulkhead and the requirement to leave the aft-seated passenger with adequate room to enter and exit his/her seat and use the meal tray. The amount of forward movement of the seat back is limited to a position where the passenger is in a forwardmost or "upright" sitting position for taxi, take-off and landing (TTOL).

Aircraft passenger seats are designed such that the seat back will not move beyond these predetermined positions under regular use. However, provision must also be made for the abnormal situation where severe G-force loads are directed against the seat back. In such cases, the seat back must be allowed to move forward past the upright sitting position, referred to as "breakover," in a controlled manner in order to minimize damage to the seat and injury to an aft-seated passenger who may be thrown against a backside of the seat back during an emergency event.

As used herein, static abuse loads refer to those loads which are applied to the seat back during normal, regular or routine use, such as loads imposed by the seated occupant, passengers pushing or leaning on the seat back during ingress and egress, and minor rear impacts such as may occur during hard landings or short stops upon landing. As used herein, intertial/dynamic loads refer to those loads in excess of a static abuse load and as specified in government regulations or aircraft manufacturer specifications. These requirements are well-known to all aircraft seat manufacturers. Inertial loads may range, for example, between 1.5 g to 9 g in varying directions under conventional analysis. Dynamic loads may range, for example, from 14 g to 16 g such as may occur during an emergency event such as an extreme deceleration.

Typical seat back constructions include a rigid structural frame pivotally-mounted to the stationary frame assembly. On the backside of the seat back, the rigid frame may support a rigid head-pan diaphragm structure that provides a decorative finish and seat aesthetic, and may further support one or more accessories such as a video monitor, tray table, etc. On the frontside of the seat back, the rigid frame may support conventional cushions and dress covers, and in some constructions, an elastomer mesh-type diaphragm used with or without conventional cushions and dress covers.

Advances in materials, particularly in the area of composites, have been progressively introduced into passenger seat constructions. For example, glass and carbon fiber reinforced plastic laminates and sandwich constructions offer significant advantages over metals in terms of weight reduction, adaptability to complex and curved shapes, and fatigue behavior. While better in some respects such as lightweight, corrosion resistance, high strength-to-weight ratio, design flexibility, etc., composite materials are inferior to metals in terms of brittleness and their ability to withstand impact and sudden dynamic loads. This a concern in seat constructions, and particularly in seat back constructions required to meet passenger head impact dynamic testing requirements, referred to as "Head Injury Criterion" or "HIC."

Accordingly, to protect passengers from shatter-related injuries, what is needed is a seat back construction that benefits from the use of composite materials without the disadvantages of brittleness and the tendency of such materials to shatter upon impact and not plastically deform like most metal alloys.

SUMMARY OF THE INVENTIVE ASPECTS

To achieve the foregoing and other advantages, inventive aspects disclosed herein are directed to a seat back assembly including a seat back frame member and an attached head-pan diaphragm structure positioned in a head strike target area of the seat back assembly, the head-pan diaphragm including high-performance fibers.

In some embodiments, the high-performance fibers are selected from the group of fibers including synthetic fibers, ballistic fibers, aramid fibers, and ultra-high molecular weight polyethylene fibers.

In some embodiments, the head-pan diaphragm structure includes a multi-ply construction including a first layer of material including the high-performance fibers applied over a second layer of material devoid of the high-performance fibers.

In some embodiments, the second layer of material may be carbon fiber reinforced composite material.

In some embodiments, the multi-ply construction may include one or more layers of woven fabrics or sheets of fibers laid-up and cured together.

In some embodiments, the woven fabrics may be embedded in a polymeric matrix to fill void spaces between the fibers.

In some embodiments, the head-pan diaphragm structure may include the at least one layer including the high-performance fibers positioned within a portion of a carbon fiber reinforced composite material.

In some embodiments, the at least one layer including the high-performance fibers may be a flexible fabric having an open mesh, tight weave, or non-woven construction.

In some embodiments, the seat back assembly may further include a cross member attached to the seat back frame member, the seat back frame member and the cross member forming a frame closed out by the head-pan diaphragm structure, and wherein at least one of the cross member and the seat back frame member is made of carbon fiber reinforced composite material.

The inventive aspects disclosed herein are further directed to an aircraft passenger seat assembly including a seat frame assembly, a seat bottom attached to the seat frame assembly, and a seat back assembly attached to the seat frame assembly. The seat back assembly includes a seat back frame pivotally-attached to the seat frame assembly, a cross member attached to the seat back frame, the seat back frame and the cross member forming a frame, and a head-pan diaphragm structure mounted within the frame and positioned on a backside of the seat back assembly in a head strike target area, the head-pan diaphragm structure including at least one layer including high-performance fibers.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 6 is a front perspective view of a seat back construction according to a third embodiment, shown with the cushions and dress cover removed.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Disclosed herein are inventive aspects of seat back element and aircraft passenger seat constructions incorporating high-performance fibers incorporated into predetermined seat back target areas. As used herein, the term "high-performance" with respect to fibers generally refers to synthetic fibers and the like having a high or extremely high tensile strength and tending to be less brittle than glass fibers and carbon fibers. Fibers may be provided as individual fiber strands, tows of untwisted bundles of filaments, coarse broken fiber, etc. Examples of high-performance fibers include, but are not limited to, ballistic fibers, ultra-high molecular weight polyethylene fibers, aramid fibers, high modulus polypropylene fibers, and high molecular weight polyolefin fibers. Commercial examples of high-performance fibers include, but are not limited to, Kevlar™ and Zylon™. For long-term use in seat back applications, the high-performance fibers may be stabilized during manufacture or treated with ultraviolet absorbers or light screeners to improve performance. High-performance fibers are incorporated into seat back elements to avoid shatter caused by impact, among other advantages and benefits.

Figure 1:
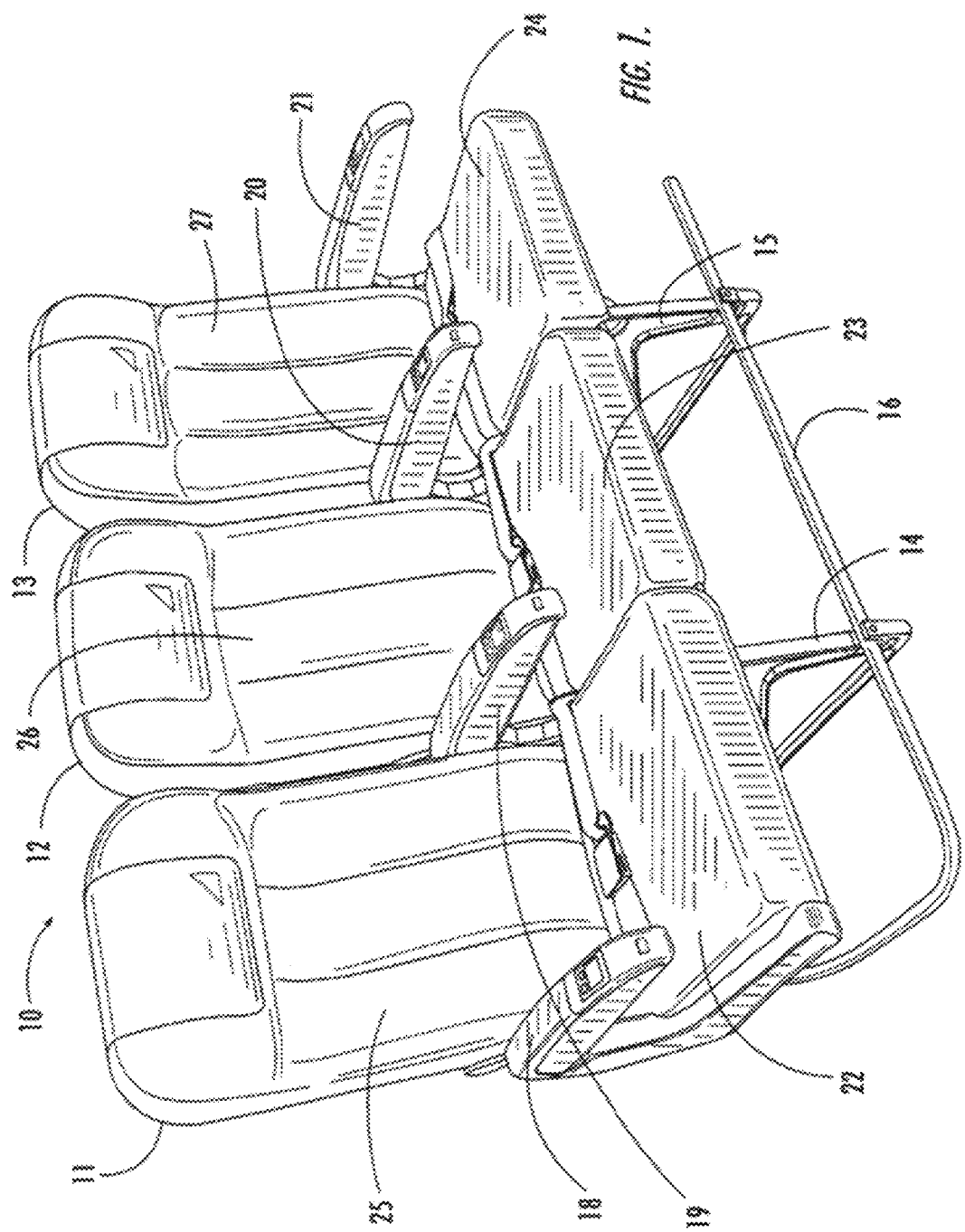
FIG. 1 is a front perspective view of a seat set of exemplary aircraft passenger seats.
Figure 2:
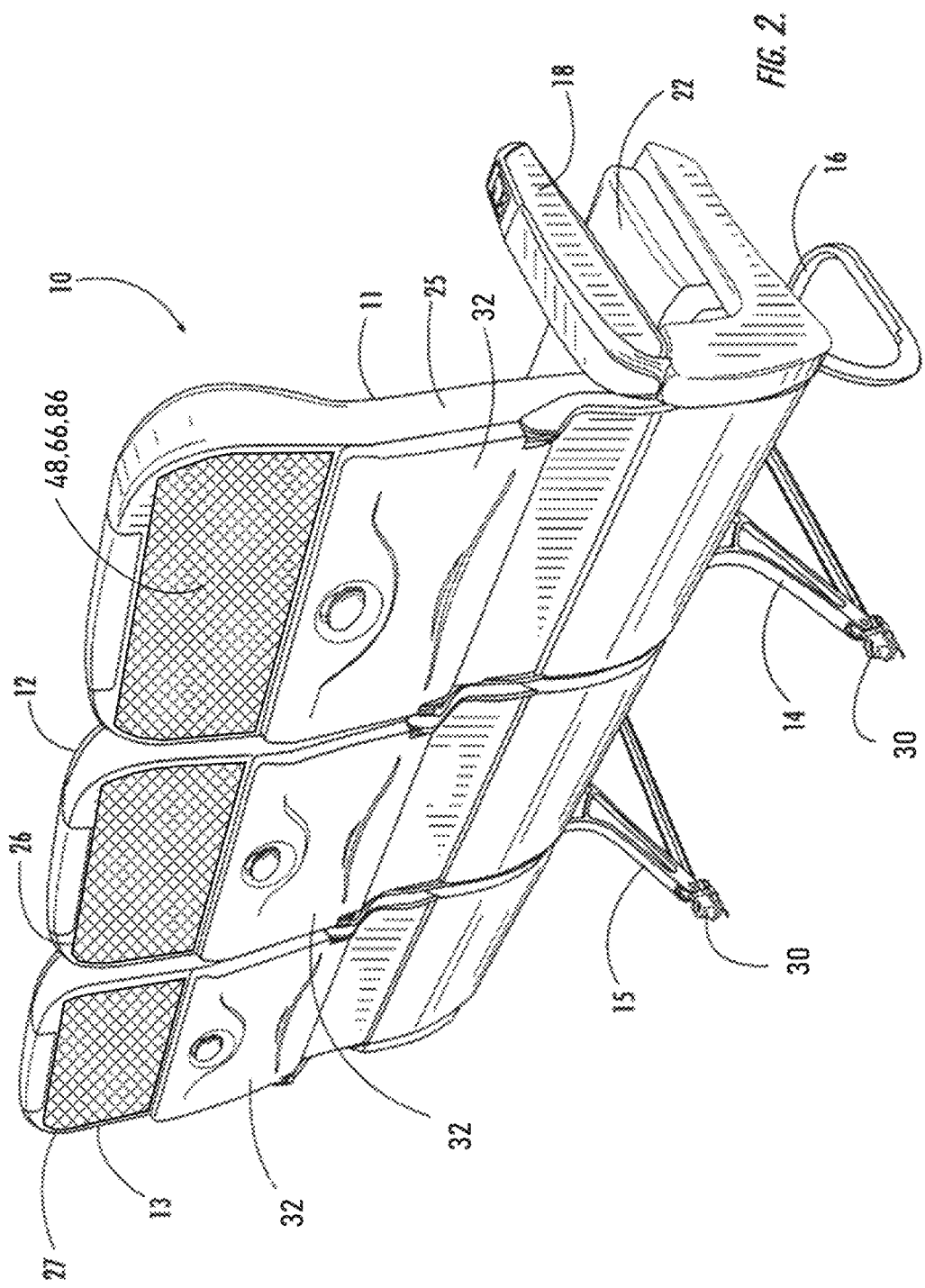
FIG. 2 is a rear perspective view of the seat set shown in FIG. 1.
Figure 3:
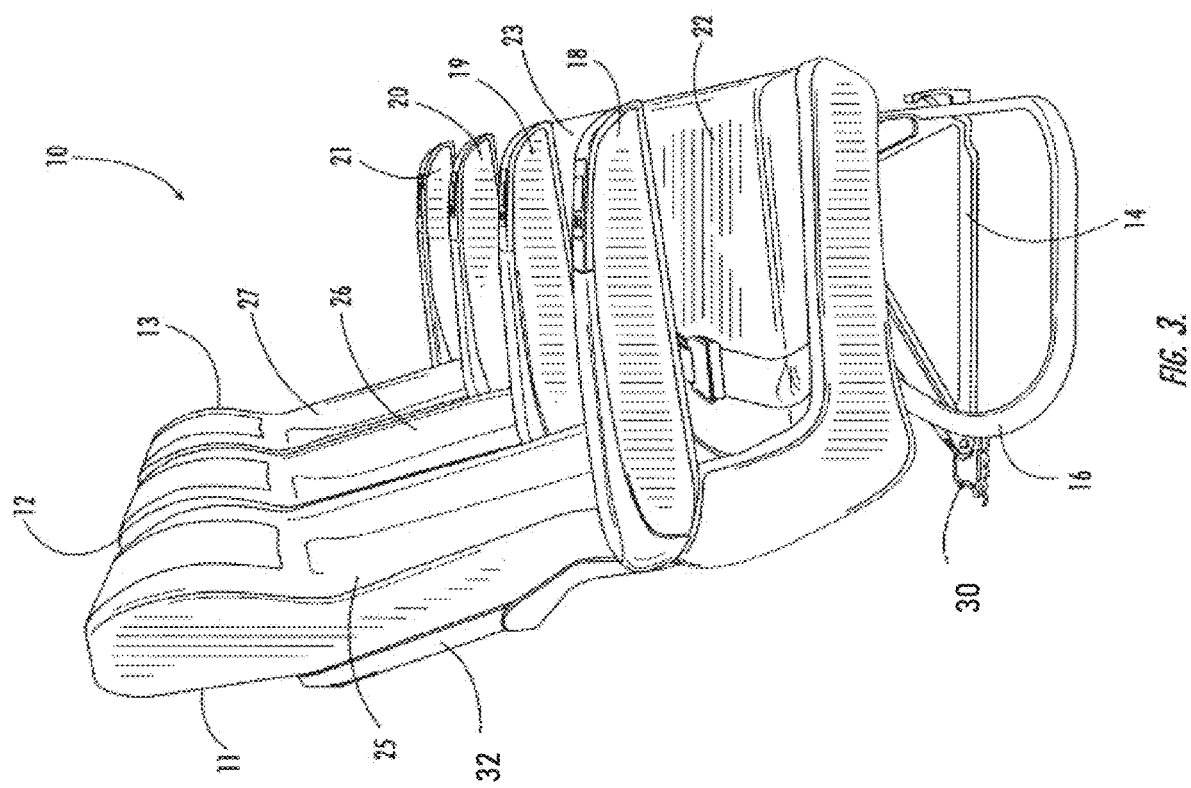
FIG. 3 is an end perspective view of the seat set shown in FIG. 1.

Referring now specifically to the drawings, a non-limiting example of an aircraft passenger seat set is shown in FIGS. 1-3 at reference numeral 10. The seat set 10 includes three adjacent seats, for example, an aisle seat 11, a center seat 12, and a window seat 13. The seat set 10 is supported on a pair of legs 14 and 15 and includes an optional baggage bar 16. The seats 11, 12, 13 are provided with arm rests 18, 19, 20, 21. The seats 11, 12, 13 include seat bottoms 22, 23, 24, respectively, and seat backs 25, 26, 27, respectively.

The seat set 10 as shown is supported on and shares two legs 14, 15. The legs 14, 15 may be coupled to transverse beams that may be coupled to spreaders. The legs, transverse beams, and spreaders tie together to form a structural frame assembly having significant structural integrity within passenger comfort and government regulation requirements. The seat pans 22, 23, 24 are mounted on the structural frame assembly. The seat backs 25, 26, 27 are pivotally-mounted to the structural frame assembly for movement between upright and reclined sitting positions. The seat set 10 can be integrated together to form seat sets of different lengths, spacings, and numbers of seats. Each leg 14, 15 may have an attached floor track fitting 30 for attaching the seat set securely to the floor. Each seat 11, 12, 13, may optionally include a tray table 32 mounted for movement between a stowage position flush against the back side of the seat back and a lowered, horizontal use position by an aft-seated passenger.

Although not shown, each seat 11, 12, 13 may be equipped with a breakover assembly operable for allowing forward movement past the upright sitting position under abnormal loads, for example, in the event the seat back is struck with a sufficiently hard forwardly-directed force such as might occur if hit from the rear by an occupant seated directly behind the seat. The breakover assembly operates to prevent damage to the seat resulting from a severe rear impact and to at least reduce injury to an occupant thrown against the backside of the seat back by allowing the seat back to move forward in a controlled manner. Each seat back 25, 26, 27 further includes a head-pan diaphragm structure 48 positioned in a HIC target area. The head-pan diaphragm structure 48 generally includes at least one layer of high-performance fibers as an integral part of the diaphragm makeup.

Figure 4:
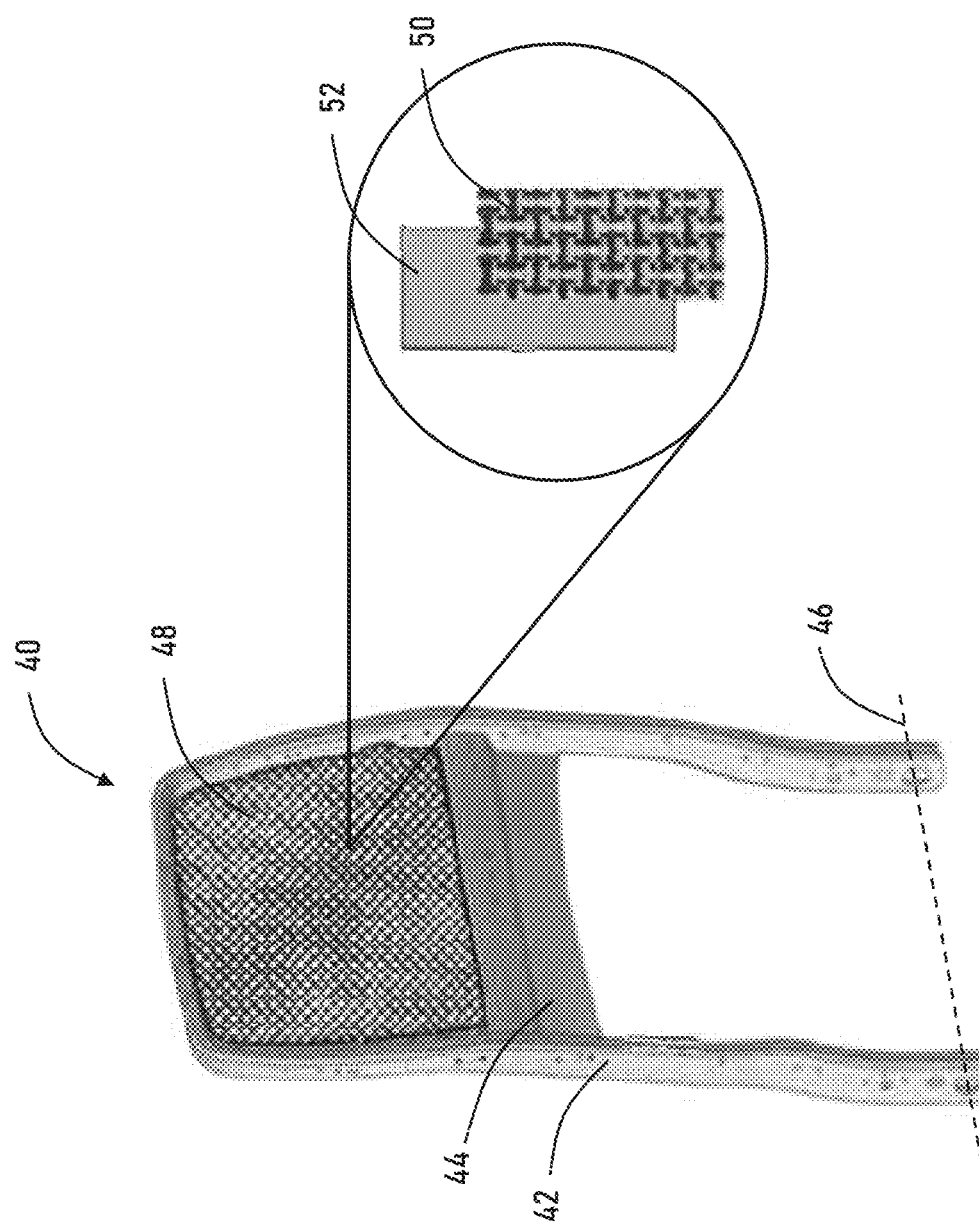
FIG. 4 is a front perspective view of a seat back construction according to a first embodiment, shown with the cushions and dress cover removed.

FIG. 4 shows a first seat back assembly 40 of one of the seat backs 25, 26, 27 of one of the seats 11, 12, 13. The frontside cushions and dress cover are removed for clarity, among other components, revealing the underlying structural frame. In some embodiments the frame may remain exposed, at least on the backside of the assembly. The seat back assembly 40 generally includes a seat back frame member 42 having an ergonomic geometry providing structural support and generally defining the seat back shape. The seat back frame member 42 may be made of lightweight and strong materials such as reinforced composites, aluminum alloy, or combinations thereof, and may or may not incorporate high-performance fibers. A cross member such as a torsion bar 44 attaches to and stabilizes the spacing between spaced-apart portions of the seat back frame member 42. The torsion bar 44 together with a portion of the seat back frame member 42 frames out an opening in an anticipated head strike area. The seat back frame member 42 and/or torsion bar 44 may be made from multiple plies of material preformed and co-cured as a unit allowing at least parts of the frame to be substantially hollow for weight reduction. The seat back may be pivotally adjustable relative to the spreaders about a generally horizontal, fixed, laterally-extending pivot axis 46.

Whereas conventional aircraft seat back assemblies are devoid of high-performance fibers in all aspects of their construction, the seat back assemblies disclosed herein integrate high-performance fibers into at least part of the seat back construction, and particularly, integrate high-performance fibers in the head-pan diaphragm structure 48 positioned in the head strike target area. In the first non-limiting example of the seat back assembly 40 shown in FIG. 4, the head-pan diaphragm structure 48 comprises a lay-up of layers and is mounted within and closes out the framed opening formed by the seat back frame member 42 and the torsion bar 44. The head-pan diaphragm structure 48 may be a multi-ply construction including at least one first layer of material 50 including high-performance fibers and at least one second layer of material 52 devoid of high-performance fibers. For example, the first layer of material 50 may be applied atop or in front of the second layer of material 52. Alternatively, the first layer of material 50 may be applied between second layers of material 52, or different layered arrangements. The layer of material including high-performance fibers may be positioned directly facing the aft-seated passenger for direct contact in a HIC target area. The second layer of material 52 may be positioned inward or behind the first layer of material and thus away from direct contact with the aft-passenger in the event of a head impact. The second layer of material 52 may include, for example, one or more layers of composite material that may or may not be backed with fiberglass. The composite material may include, for example, carbon fiber reinforced polymer consisting of a matrix (e.g., polymer resin or epoxy) and a reinforcement (e.g., carbon fibers) for strength.

The head-pan diaphragm structure 48 may include, for example, high-performance composites formed from layers of woven fabrics or sheets of fibers that are plied together. The fibers in a sheet may be unidirectionally oriented or felted in a random orientation. When the individual plies are unidirectionally oriented fibers, the successive plies may be rotated relative to one another, for example, at angles of 0°/90° or ±45° or at other angles. Individual plies of woven fabrics or fibers may be uncoated or embedded in a polymeric matrix to fill void spaces between the fibers. Fabric or fiber sheets without a matrix may be used when flexibility is preferred. Composites including fibers and a matrix material may be used when rigidity is preferred. For example, rigid composites may be made by bonding plies together using heat and pressure to adhere the matrix in each ply, forming a bond between them, and consolidating the whole into a unitary article. The amount of matrix may be varied to customize the flexibility and weight of the finished article.

The head-pan diaphragm structure 48 may include hybrid fabric reinforcements that combine two or more different fibers in a common matrix, thereby expanding the range of achievable properties. Hybrid fabrics may be provided in a variety of weaves, weights, widths and finishes to suit the specific application. The head-pan diaphragm structure 48 may include knitted fabrics that allow the fibers to lay in a flat plain to carry loads more efficiently for greater stiffness and strength as compared to woven fibers. Fabric architecture may be unidirectional, biaxial (0°/90°), double bias (+45°, −45°), triaxial (+45°, −45°, 0° or 90°), quadraxial (+/−45°, 0°, 90°), or other and formed in a laminate. Other materials may include interlaced fabrics and matting.

The head-pan diaphragm structure 48 is mounted to the seat back frame member 42 generally in the target area of a possible head strike. The head-pan diaphragm structure 48 may include a unitary panel or multiple panels joined together. In some embodiments, the head-pan diaphragm structure 48 may be rigid and thus fastenable to the structural frame 42 and torsion bar 44 or preformed and co-cured as a unit.

Figure 5:
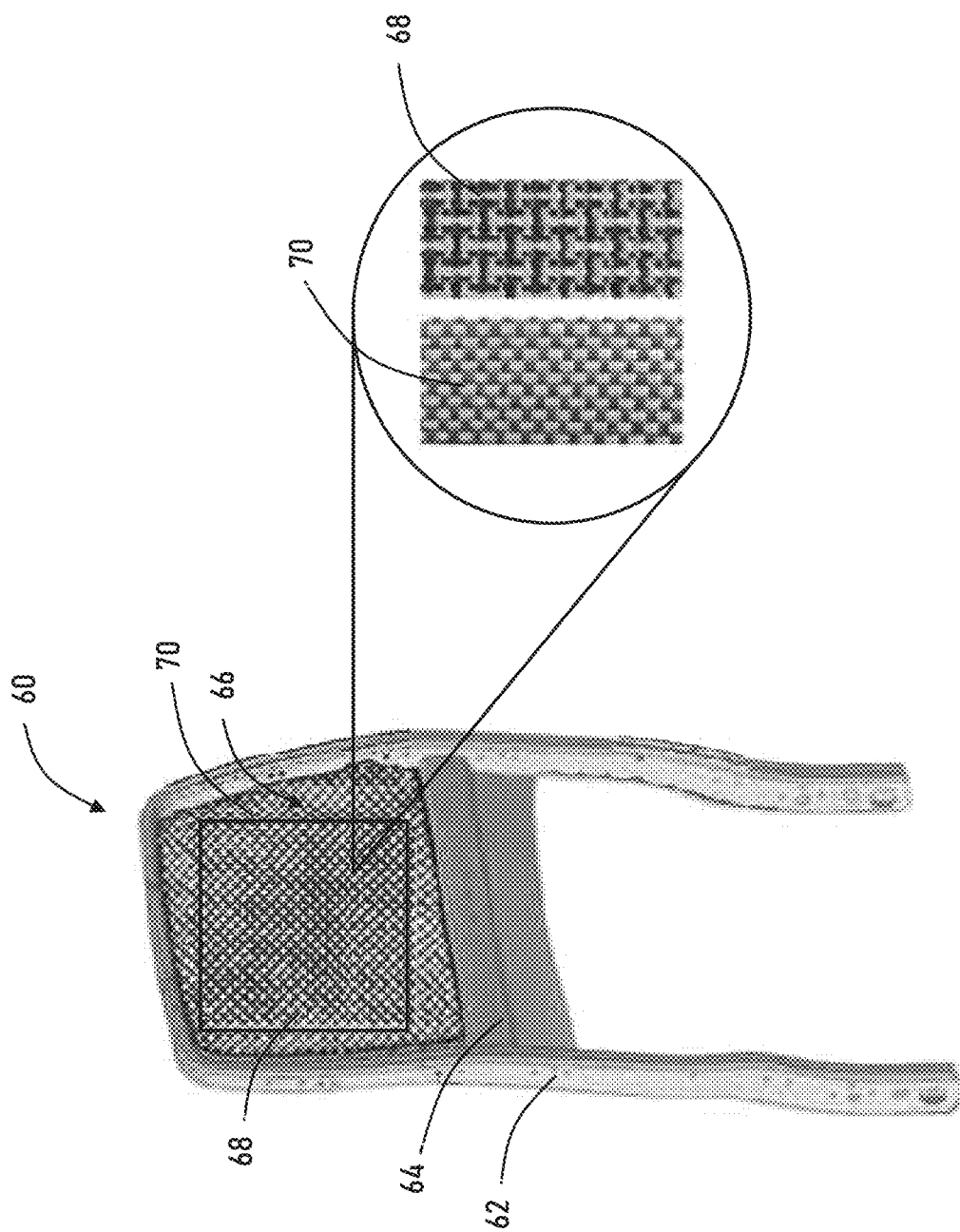
FIG. 5 is a front perspective view of a seat back construction according to a second embodiment, shown with the cushions and dress cover removed.

FIG. 5 shows a second non-limiting example of a seat back assembly 60 of one of the seat backs 25, 26, 27 of one of the seats 11, 12, 13. Like the first seat back assembly 40, the second seat back assembly 60 includes a seat back frame member 42 and torsion bar 44. Like the first seat back assembly 40, the head-pan diaphragm structure 48 of the second seat back assembly 60 may be rigid. Unlike the first seat back assembly 40, wherein the head-pan diaphragm structure 48 includes a continuous first layer of material covering applied over a second layer of material, and thus the first layer of material filling the frame, the head-pan diaphragm structure 48 of the second seat back assembly 60 positions a first layer of material 50 including the high-performance fibers in a predetermined area within or applied over a second layer of material 52 devoid of high-performance fibers. This configuration allows a portion of the carbon or glass fiber composite layer of material to be substituted for or replaced with a high-performance fiber composite layer. This configuration may be preferable for weight and/or cost savings.

FIG. 6 shows a third non-limiting example of a seat back assembly 80 of one of the seat backs 25, 26, 27 of one of the seats 11, 12, 13. Like the first and second seat back assemblies 40, 60, the third seat back assembly 80 includes a seat back frame member 42 and torsion bar 44. Unlike the first and second seat back assemblies 40, 60, the head-pan diaphragm structure 86 of the third seat back assembly 80 is at least in part a flexible, open layer. Flexibility may be achieved, for example, by leaving the fabric uncoated or reducing the amount of or eliminating the polymeric matrix filler in the void spaces between the fibers. The head-pan diaphragm structure 48 may have any suitable fabric construction such as an open mesh, tight weave, or non-woven construction. Part or the entirety of the standard carbon or glass fiber lay-up may be substituted with high-performance fibers. In the case of a flexible head-pan diaphragm structure 48, the head-pan diaphragm structure may be stretched laterally and/or vertically and secured between the seat back frame member 42 and torsion bar 44. In each of the embodiments disclosed herein, the head-pan diaphragm structure 48 may additionally serve as the frontside support element of the seat back.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:
1. A seat back assembly, comprising:
 a continuous perimeter frame including spaced apart side members and an interconnecting top member;
 a torsion bar attached to and extending between the spaced apart side members at a predetermined position spaced apart from the interconnecting top member to divide the seat back assembly into a upper portion above the torsion bar corresponding to a headrest portion of the seat back assembly and a lower portion below the torsion bar corresponding to a backrest portion of the seat back assembly; and a head-pan diaphragm structure filling a framed opening of the upper portion, the head-pan diaphragm structure positioned in a head strike target area on a backside of the upper portion, and the head-pan diaphragm member including integrated high-performance fibers.

2. The seat back assembly of claim 1, wherein the high-performance fibers are selected from the group of fibers including synthetic fibers, ballistic fibers, aramid fibers, and ultra-high molecular weight polyethylene fibers.

3. The seat back assembly of claim 1, wherein the head-pan diaphragm structure comprises a multi-ply construction including a first layer of material including the high-performance fibers applied over a second layer of material devoid of the high-performance fibers.

4. The seat back assembly of claim 3, wherein the second layer of material is carbon fiber reinforced composite material.

5. The seat back assembly of claim 3, wherein the first layer of material is made from layers of woven fabrics or sheets of fibers plied together.

6. The seat back assembly of claim 5, wherein the woven fabrics are embedded in a polymeric matrix to fill void spaces between the fibers.

7. The seat back assembly of claim 1, wherein the head-pan diaphragm structure includes high-performance fibers integrated into at least a portion of a carbon fiber reinforced composite material.

8. The seat back assembly of claim 1, wherein the head-pan diaphragm structure is a flexible fabric having an open mesh, tight weave, or non-woven construction.

9. An aircraft passenger seat assembly, comprising:
a seat frame assembly;
a seat pan attached to the seat frame assembly; and
a seat back pivotally attached to the seat frame assembly, the seat back including:

i) a U-shaped frame member including spaced apart side members and an interconnecting top member;

ii) a torsion bar attached to and extending between the spaced apart side members at a predetermined distance spaced apart from the interconnecting top member to divide the seat back into an upper portion above the torsion bar corresponding to a headrest portion and a lower portion below the torsion bar corresponding to a backrest portion; and iii) a head-pan diaphragm structure mounted within and filling a framed opening of the headrest portion, the head-pan diaphragm structure including high-performance fibers.

10. The aircraft passenger seat assembly of claim 9, wherein the high-performance fibers are selected from the group of fibers including synthetic fibers, ballistic fibers, aramid fibers, and ultra-high molecular weight polyethylene fibers.

11. The aircraft passenger seat assembly of claim 9, wherein the head-pan diaphragm structure comprises a multi-ply construction including at least one first layer including the high-performance fibers and at least one second layer devoid of the high-performance fibers.

12. The aircraft passenger seat assembly of claim 11, wherein the second layer includes carbon fiber reinforced composite material.

13. The aircraft passenger seat assembly of claim 11, wherein the first layer is made from layers of woven fabrics or sheets of fibers plied together.

14. The aircraft passenger seat assembly of claim 11, wherein the woven fabrics are embedded in a polymeric matrix to fill void spaces between the fibers.

15. The aircraft passenger seat assembly of claim 9, wherein the head-pan diaphragm structure is a flexible fabric having an open mesh, tight weave, or non-woven construction.

* * * * *